United States Patent [19]
Leenaards

[11] 3,884,366
[45] May 20, 1975

[54] PALLETISING OR DEPALLETISING MAGAZINE

[75] Inventor: Antoine Joseph Leenaards, Lausanne, Switzerland

[73] Assignee: Crown Cork & Seal Co. Inc., Philadelphia, Pa.

[22] Filed: Jan. 2, 1973

[21] Appl. No.: 320,498

[30] Foreign Application Priority Data
Jan. 11, 1972  Belgium .............................. 777899

[52] U.S. Cl. ........................... 214/6 BA; 214/8.5 K
[51] Int. Cl. ........................................... B65g 59/06
[58] Field of Search ........... 214/8.5 K, 8.5 A, 8.5 R, 214/6 BA; 221/251, 289, 298

[56] References Cited
UNITED STATES PATENTS
3,428,192  2/1969  Witmer ............................ 214/8.5 A
3,523,617  8/1970  Raynor ............................ 214/8.5 A FOREIGN PATENTS OR APPLICATIONS
213,338  2/1961  Austria .............................. 214/6 A
212,567  4/1967  Sweden .......................... 214/8.5 K Primary Examiner—Robert J. Spar
Assistant Examiner—George F. Abraham
Attorney, Agent, or Firm—Woodcock, Washburn, Kurtz & Mackiewicz

[57] ABSTRACT

A palletising or depalletising magazine comprising substantially horizontal fork members for supporting a stack of pallets above a conveyor. The support means are introduced under and withdrawn from the lower pallets in a stack and raised and lowered above the conveyor as the conveyors are intermittently operated. Cams mounted on a control shaft driven by a motor control the movement of the forks.

13 Claims, 15 Drawing Figures

PALLETISING OR DEPALLETISING MAGAZINE

BACKGROUND OF THE INVENTION

The present invention relates to a palletising or depalletising magazine.

A palletising or depalletising magazine may contain a stack of superimposed pallets. The lower pallet of the stack is carried by retractable supports arranged constantly at equal levels. The pallets are individually removed from the magazine by being successively deposited onto a conveyor mounted at the base of said magazine.

In certain known magazines of this kind, the retractable supports of the stack of pallets comprise radially disposed wheel spokes rotating periodically in synchronism around two horizontal axles arranged at equal levels. The wheel spokes carrying the stack of pallets are arranged horizontally and directed in pairs towards one another. When the spokes rotate downwards as is necessary for removing a pallet, they let the lower pallet fall freely from the stack onto the conveyor of withdrawal while the remaining spokes turn inwards of the magazine and are engaged beneath the upper members of the forelast or penultimate lower pallet of the stack so as to support it and carry the remaining pallets.

In the first known palletising or depalletising magazines, the vertically displaceable retractable supports have several drawbacks. The retractable supports show a friction against the pallets. In addition, the retractable supports cause pallets to fall individually onto the endless conveyor with the risk of breaking them and damaging the conveyor. Moreover, the retractable supports need to rotate in strict synchronism and their spokes should be correctly aligned to maintain the stack of pallets straight and to avoid several pallets falling simultaneously onto the withdrawal conveyor.

In other known palletising or depalletising magazines, the retractable supports are formed with levers pivoting horizontally in synchronism around two horizontal axles arranged at equal levels or around several vertical axles. In this instance, the pivoting of levers carrying the stack of pallets is coordinated with the rise, respectively the fall of a central, vertically movable support. In the upper position, the central support carries the stack of pallets and lifts the lower pallet from the retractable lateral levers which then pivot to be disengaged from the pallets. Thereafter during the drop of the central support with the stack of pallets from a height corresponding to that of a pallet, the lateral retractable supports pivot to be placed under the upper members of the penultimate lower pallet of the stack to be handled. During the subsequent drop of the central support, the retractable lateral supports sustain the penultimate lower pallet and carry the remaining pallets of the stack. In the lower position, the central support releases the lower pallet onto the conveyor without hindering the work of the latter. The rise of the central support and the pivoting of the lateral retractable levers provide for continuation of identical cycles for the removal of the other pallets of the stack.

In the second kind of known palletising or depalletising magazine, the retractable supports should also have a good synchronism and be at equal levels in working position. Moreover, the retractable supports can only act in combination with a central support in the form of an elevator constantly movable in the magazine.

In addition to the above-cited drawbacks, the known palletising or depalletising magazines are suitable and adapted each time for a determined type of pallet. These known magazines cannot handle a damaged pallet because the retractable supports can normally support the latter only for relatively short spans at the four corners or along two of its opposite edges.

SUMMARY OF THE INVENTION

The purpose of the present invention is a new palletising or depalletising magazine for overcoming the drawbacks of the prior art.

In the palletising or depalletising magazine of this invention, the retractable supports comprise two substantially horizontal forks. The forks are successively lowered into the palletising or depalletising magazine to bring the stack of pallets onto the conveyor which is then stationary, removed from the final lower pallet resting on the conveyor, re-introduced into the magazine at the level of the penultimate lower pallet and raised in the magazine to then carry the penultimate lower pallet and to raise it as well as the remaining pallets. In that way, the final lower pallet of the stack remains alone on the conveyor which can then be operated. On the other hand, the forks are again displaced in the same manner to perform indentical cycles, providing for the individual removal of the remaining pallets of the stack.

Practically, the forks are successively displaceable according to determined vertical and horizontal paths. According to a first vertical path, the forks are movable from an upper advanced position wherein they carry the stack of pallets in the magazine to a lower advanced position wherein they place the stack of pallets in the magazine on the conveyor which is then stationary and release the final lower pallet. According to a second horizontal path, the forks are movable from the lower advanced position to a lower withdrawn position wherein they are removed from the magazine. According to a third vertical path, the forks are movable from the lower withdrawn position to an intermediate withdrawn position wherein they are located outside the magazine at the level of the penultimate lower pallet of the stack resting on the conveyor. According to a fourth horizontal path, the forks are movable from the intermediate withdrawn position to an intermediate advanced position wherein they are engaged in the magazine below the upper members of the lower penultimate pallet of the stack resting on the conveyor. According to a fifth vertical path, the forks are movable from the intermediate advanced position to the upper advanced position up to which they raise the remaining pallets in the magazine.

Preferably, the forks which are elongated extend under the final lower pallet a distance greater than half the dimension of the pallets as measured in a direction parallel to the elongated dimension of the forks. The forks may also be rigidly interconnected.

According to particular features of the invention, the forks may be controlled electromechanically, pneumatically or hydraulically.

To insure a determined periodicity of the displacements of the forks and to obtain these displacements successively and nonsimultaneously, these forks are controlled advantageously by a single motor member. In this instance, the single motor member preferably drives a control shaft acting selectively on the one hand on at least one pivoting lever articulated to the forks and ensuring their horizontal displacements and on the other hand on at least one crank articulated to a connecting rod connected to the forks and ensuring their vertical displacements. Practically, the control shaft acts via cams on the pivoting lever and on the crank.

According to an important feature of the new palletising or depalletising magazine having a single motor member and a single control shaft, the contact point between the pivoting lever and the corresponding cam is located substantially level with the control shaft and on the opposite side to the magazine relative to said control shaft. The pivoting lever is moreover influenced elastically by a spring so as to be applied against said cam. On the other hand, the contact point between the crank and the corresponding cam is located slightly above the level of said control shaft and on the same side as the magazine. In addition, the crank is influenced so as to be supported against said cam substantially under the weight of the loads which it carries.

According to a mechanical feature of the novel palletising or depalletising magazine, the forks are guided horizontally and/or vertically by guidance means having rollers.

Advantageously, in the new palletising or depalletising magazine, the single motor member is reversible to transmit selectively to the control shaft of a rotation in one or other direction. This feature renders the magazine interesting by permitting its selective use for stacking or unstacking pallets. Thus, the transmission means connecting the single motor member to the control shaft comprise a direction reverser.

BRIEF DESCRIPTION OF THE DRAWINGS

Other details and particular features of the invention will appear during description of the accompanying drawings which represent schematically and only in an examplary way an embodiment of the invention.

In these different figures, identical reference numerals refer to identical elements.

DETAILED DESCRIPTION OF A PREFERRED EMBODIMENT

Figure 1:
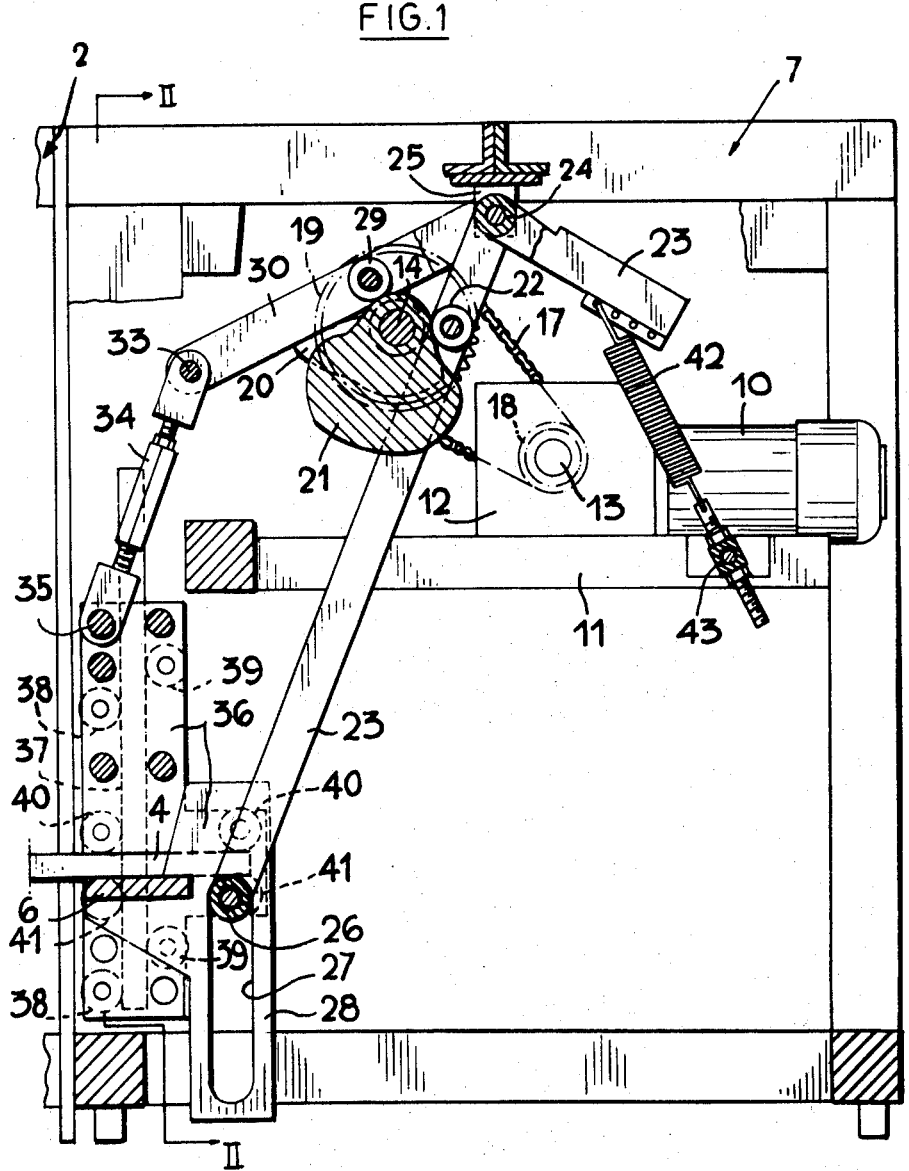
FIG. 1 is a central vertical cross-section of an embodiment of the palletising or depalletising magazine according to this invention.

Referring to FIGS. 1, 2 and 10–15, the palletising or depalletising magazine illustrated is used to handle pallets 1.

The palletising or depalletising magazine comprises a frame 2 wherein a stack 3 of superimposed pallets 1 is disposed. Generally the pallets 1 are introduced simultaneously through the aperture of the upper part of the frame 2 and are to be individually removed at the lower part of the frame 2.

In the palletising or depalletising magazine, the stack 3 of pallets 1 is carried by retractable supports comprising for example two co-planar parallel, horizontal forks 4. The pallets 1 of the stack 3 are deposited successively by the forks 4 onto an endless conveyor 5 mounted at the base of the frame 2 so as to be individually removable towards a place of use.

The forks 4 are rigidly connected to one another by means of a cross bar 6 disposed constantly on the outer part of the frame 2. The forks 4 and the cross bar 6 form thus a one piece assembly subjected to predetermined movements, provided by control and transmission means arranged in a framework 7 adjacent to the frame 2.

It is particularly important that the forks which are elongated extend under the pallets and from one side of the stack a distance greater than half the dimension of the pallets as measured in a direction parallel to the direction of fork elongation.

Figure 9:
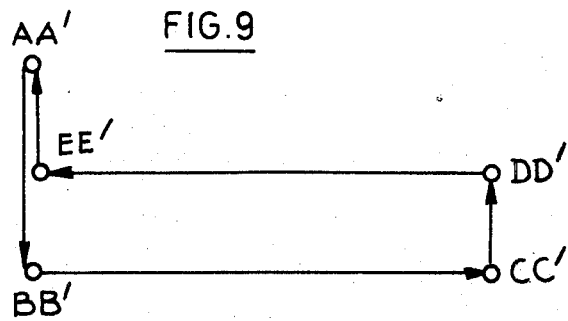
FIG. 9 is a vectorial schema of the displacements of the forks of the palletising or depalletising magazine.

To permit individual removal of the pallets 1 from the palletising or depalletising magazine starting from the stack 3, the forks 4 are displaced in the way illustrated in the schematic of FIG. 9 and act on the pallets according to the schematic of FIGS. 10–15.

Figure 10:
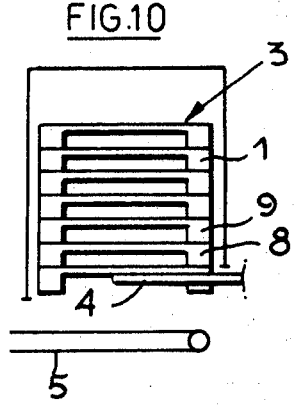
FIGS. 10–15 are schemas illustrating the work of the forks on the pallets in the palletising or depalletising magazine.

In order to understand the displacements of the forks 4, the description will begin with a reference or starting position. The reference position is an upper advanced position in which the forks 4 are for a great part of their length in the palletising or depalletising magazine at the uppermost level (FIG. 10).

Figure 11:
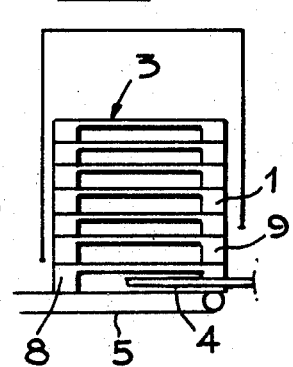

The first displacement of the forks 4 is a vertical lowering to a lower advanced position (FIG. 11). During said first displacement, the forks 4 carrying the stack 3 of pallets 1 lower said stack 3 to the lowermost level. In the vicinity of the lower advanced position, the forks 4 place the stack 3 of pallets 1 onto the stationary endless conveyor 5 and release the final lower pallet 8 of the stack 3. Thus, in the lower advanced position, the final lower pallet 8 rests on the endless conveyor 5 and is released from the forks 4.

Figure 12:
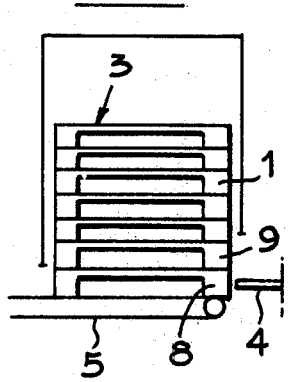
Figure 13:
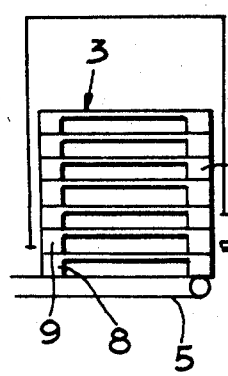
Figure 14:
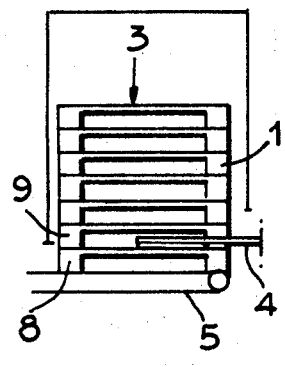
Figure 15:
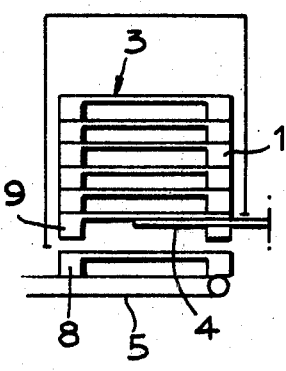

The second displacement of the forks 4 is a horizontal movement of translation from the palletising or depalletising magazine to a lower withdrawn position (FIG. 12). During said second displacement, the pallets 1 remain stationary on the stationary endless conveyor 5. The purpose of said second displacement is substantially to disengage completely the forks 4 from the palletising or depalletising magazine.

The third displacement of the forks 4 is a vertical rise from the palletising or depalletising magazine to an intermediate withdrawn position (FIG. 13) located at a lower level than the reference position for example halfway between the upper and lower advanced positions. In fact, the intermediate withdrawn position is determined by the pallets 1 and more precisely by their thickness. The purpose of said third displacement is to bring the forks 4 to the level of the penultimate lower pallet 9 of the stack 3. In fact, the forks 4 being in the intermediate withdrawn position are located in front of the hollow spaces of the penultimate lower pallet 9. During said third displacement of the forks 4, the pallets 1 and the endless conveyor 5 still remain stationary.

The fourth displacement of the forks 4 is a horizontal movement of translation to an intermediate advanced position (FIG. 14) wherein the forks 4 are brought back for a great part of their length to the palletising or depalletising magazine below the upper member of the lower penultimate pallet 9 and above the similar upper members of the final lower pallet 8. During said fourth displacement of the forks 4, the pallets 1 and the endless conveyor 5 still remain stationary.

The fifth and final displacement of the forks 4 is a vertical rise to the above-mentioned position. In the beginning of the fifth displacement, the forks 4 come into contact with the upper members of the penultimate lower pallet 9 (FIG. 15) and lift the latter so as to rise it as well as the remaining pallets to the reference position thereby releasing the final lower pallet 8 remaining on the endless conveyor 5. Only at that moment the endless conveyor 5 may be actuated to remove the final lower pallet 8 from the palletising or depalletising magazine.

After their return to the reference position or upper advanced position, the forks 4 are subjected to successive displacement cycles which are identical to the preceding cycles so as to ensure individual removal of the remaining pallets 1 of the stack 3.

Figure 2:
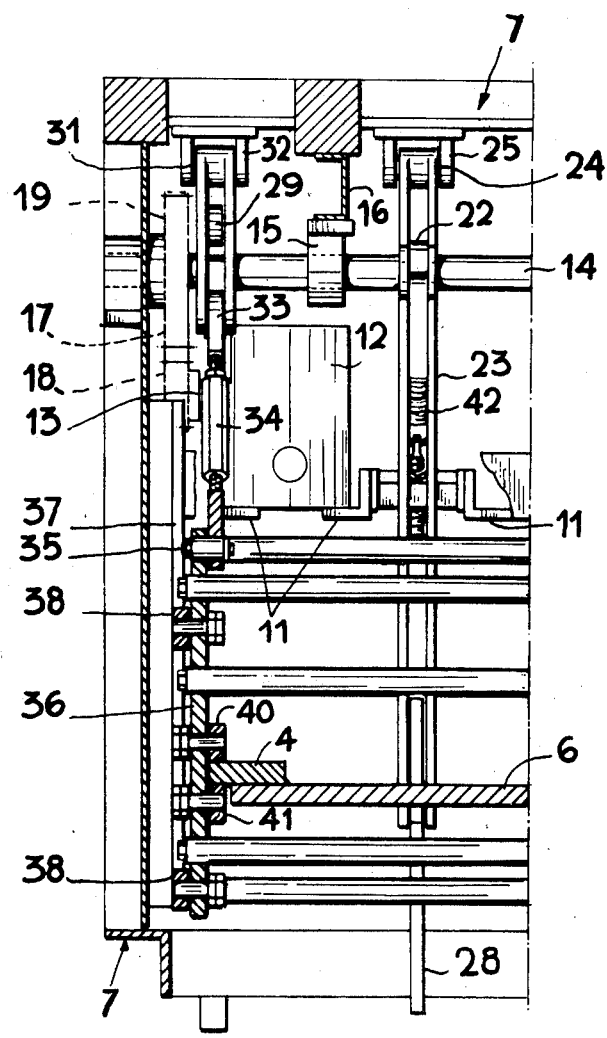
FIG. 2 is another vertical cross-section of the palletising or depalletising magazine at right-angle of the preceding Figure, along lines II—II of said FIG. 1.
Figure 3:
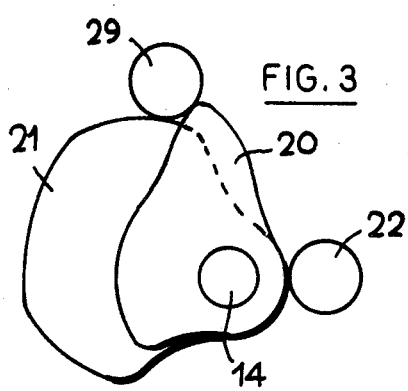
FIGS. 3–8 are schemas explaining the movements of the forks by a set of cams in the palletising or depalletising magazine.
Figure 4:
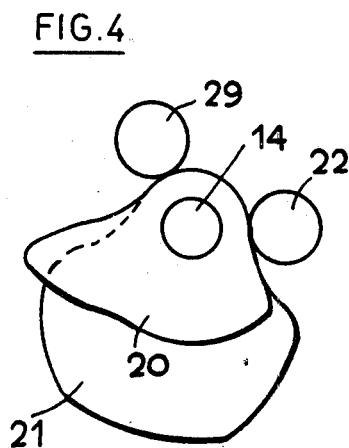
Figure 5:
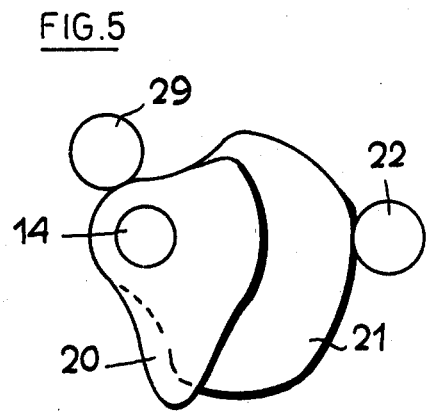
Figure 6:
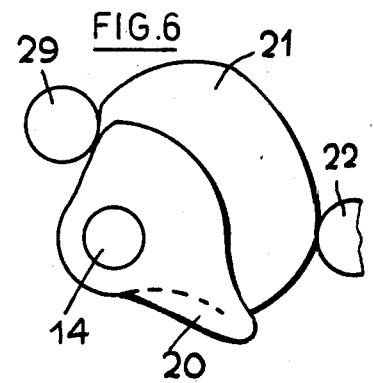
Figure 7:
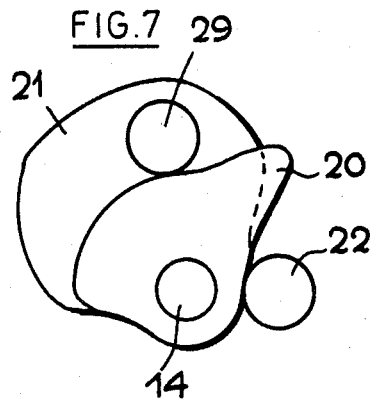
Figure 8:
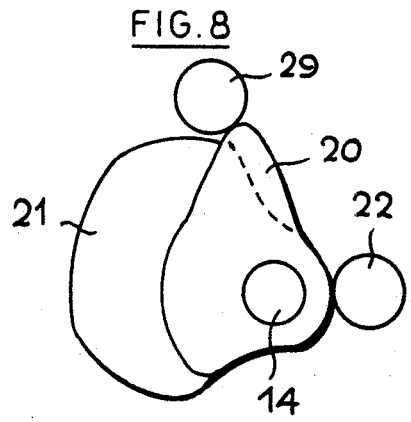

Referring to FIGS. 1 and 2, the control means for controlling the forks 4 comprise a single electrical motor 10 carried by a support 11 fixed to the framework 7. The motor 10 is reversible and with variable speed.

The motor 10 drives a speed reducer 12 mounted on the support 11. The outlet shaft 13 of the reducer 12 turns simultaneously with a control shaft 14 mounted in bearings 15 connected to U-shaped irons 16 fixed to the framework 7. Therefore, the outlet shaft 13 is mechanically connected to the control shaft 14 via a transmission chain 17 cooperating with two sprocket wheels one of which 18 is wedged on the outlet shaft 13 while the other 19 is fixed to the control shaft 14.

The single control shaft 14 carries a central cam 21 necessary for the displacement of the forks 4.

The central cam 21 cooperates with a follower roller 22 whose pivot is carried by a crank lever 23. In the selected example, the axis of pivoting movement of the follower roller 22 and the axis of the control shaft 14 are parallel with one another and substantially in a same horizontal plane at relatively short distance from one another. Moreover, the follower roller 22 is on the opposite side to the palletising or depalletising magazine relative to said control shaft 14.

At the junction of its two branches, the crank lever 23 pivots around a stationary pivot 24 connected to a U-shaped support 25 bolted to the framework 7.

The lower end of the main branch 23 of the crank lever 23 carries a roller 26 constantly engaged in a vertical groove 27 presented by a carriage member 28 edgewise fixed to the cross-bar 6 which connects the forks 4.

At determined periods, rotation of the central cam 21 produces the pivoting movement of the crank lever 23 around the stationary pivot 24 and consequently the horizontal translation movement of the forks 4 under the effect of the thrust of the roller 26 against the member 28 and thanks to the slidability of said roller 26 in the vertical groove 27 of said member 28. In that way, the central cam 21 is used for the horizontal translation movements of the forks 4 in both directions.

Each marginal cam 20 cooperates with another follower roller 29 mounted on a crank 30. In this instance, the pivoting axis of the follower roller 29 is parallel to the axis of the control shaft 14 and is located substantially at 120° of the pivoting axis of the follower roller 22 relative to the axis of said control shaft 14. The follower roller 29 is thus constantly located at a slightly higher level than the control shaft 14 while being at the same time off-set towards the palletising or depalletising magazine.

The crank 30 pivots around a stationary pivot 31 carried by a U-shaped support 32 connected to the framework 7. Each pivot 31 is coaxial with the above-cited pivot 24.

Each crank 21 is articulated by means of a pivot 33 to a connecting rod 34 in the form of a patent coupling of adjustable length. The connecting rod 34 is in its turn articulated by a pivot 35 to a particular support 36 carrying the forks 4.

Each particular support 36 is displaceable vertically along a guide 37 which is vertical, stationary and connected to the framework 7. The particular support 36 is guided by means of two sets of rollers 38 and 39 rolling laterally against the guide 37.

Each particular support 36 carries the corresponding fork 4 by means of two other sets of horizontal rollers 40 and 41 between which said fork is constantly engaged. In fact, the rollers 40 and 41 are used not only to support but also to guide the fork 4 during its horizontal translation movement.

The rotation of the marginal cams 20 causes at determined periods of time pivoting of the crank 30, rise and drop of the connecting rod 34 with variation of its inclination as well as the rise and drop of the particular supports 36 and consequently the rise and drop of the forks 4.

The successive horizontal and vertical displacements of the forks 4 may be explained by the profile of the central cam 21 and marginal cams 20.

The upper advanced position of the forks 4 corresponds to points A and A' of contact between the cams 20 and 21 and the follower rollers 22 and 29. In said position, the forks 4 are most advanced so that the point A is located at a minimum distance from the common axis of pivoting of the cams 20 and 21. On the other hand, the forks 4 are raised at a maximum so that the point A' is at the greated distance from said pivoting axis on each marginal cam 20.

The lower advanced position of the forks 4 corresponds to points B and B' of contact between the cams 20 and 21 and the follower rollers 22 and 29. In this instance, the forks 4 still are advanced at a maximum so that the point B is located at the same distance from the common axis of pivoting of the cams 20 and 21 as said point A. On the other hand, the forks 4 are lowered at a maximum. The same happens with the connecting rod-crank system carrying them so that the point B' is located at the minimum distance from said axis of pivoting.

During vertical drop of the forks 4 between the upper and lower advanced positions, these forks are only displaced vertically. In that way, the portion A B of the profile of the central cam 21 is an arc whereas the portion A'B' of the profile of each marginal cam 20 is a continuous line approaching regularly the common axis of pivoting of the cams 20 and 21.

The lower withdrawn position of the forks 4 corresponds to points C and C' of contact between the cams 20 and 21 and the follower rollers 22 and 29. Then the forks 4 are withdrawn at a maximum so that the point C is at the greatest possible distance from the common pivoting axis of the cams 20 and 21. On the other hand, the forks 4 also are lowered at a maximum so that the point C' remains at a minimum distance from said pivoting axis.

During horizontal backward movement of the forks 4 between the lower advance and withdrawn positions, said forks 4 are only horizontally movable. Thus, the portion B C of the profile of the central cam 21 is a continuous line diverging regularly from the pivoting axis of the cams 20 and 21 whereas the portion B'C' of the profile of each marginal cam 20 is an arc of circle.

The withdrawn intermediate position of the forks 4 corresponds to points D and D' of contact between the cams 20 and 21 and the follower rollers 22 and 29. At that moment the forks are still retracted at a maximum so that the point D is at the same distance from the common pivoting axis of the cams 20 and 21 as the preceding point C. However, the forks 4 are half-lifted so that the point D' is located at a determined distance between those of the preceding points A' and B' of said pivoting axis.

During the first vertical rise of the forks 4 between the lower and intermediate withdrawn positions these forks 4 are only displaced vertically. Thus, the portion C D of the profile of the central cam 21 is an arc of circle whereas the portion C'D' of the profile of each marginal cam 20 is a continuous line diverging regularly from said common pivoting axis to a determined distance from the latter comprised between the distances of points A' on B'.

The intermediate advanced position of the forks 4 corresponds to points E and E' of contact between the cams 20 and 21 and the follower rollers 22 and 29. At this stage, the forks 4 are advanced at a maximum so that the point E is at a minimum distance from the common pivoting axis of the cams 20 and 21 and the same distance from the points A and B. On the other hand, the forks 4 are also half-lifted so that the point E' is located at the same distance from said pivoting axis as the point D'.

During the horizontal forward movement of the forks 4 between the inermediate withdrawn and advanced positions, these forks 4 are only displaced horizontally. Thus, the portion D E of the profile of the central cam 20 is a continuous line approaching regularly the common pivoting axis of the cams 20 and 21 to the minimum distance relative to said pivoting axis. Moreover, the portion D'E' of the profile of each marginal cam 20 is an arc of circle.

Finally during the second vertical rise of the forks 4 between the intermediate and upper advanced positions, these forks 4 are only movable vertically. Consequently, the portion E A of the profile of the central cam 21 is an arc of circle whereas the portion E'A' of the profile of each marginal cam 20 is a continuous curve diverging regularly from the common pivoting axis of the cams 20 and 21 to the maximum distance relative to the pivoting axis which only exists for the point A.

It should be noted that in the embodiment under consideration, the follower roller 29 carried by the crank 30 rests on the corresponding marginal cam 20 under the effect of gravity due to the weight of said crank 30 and the loads supported thereby. In addition, the follower roller 22 carried by the crank lever 23 is applied elastically against the central cam 21 under the effect of a helical spring 42 connecting the shortest branch of said crank lever 23 to a fixed pivot 43 connected to the support 11 of the motor 10. In that way if the forks 4 encounter a mechanical resistance during their horizontal return to the palletising or depalletising magazine, these forks are no more influenced by their control means because of the presence of said spring 42 and also because of the position of the pivoting axis of the follower roller 22 relative to the common pivoting axis of the cams 20 and 21.

In the selected example, the forks are controlled electromechanically by a single motor member 10. In other embodiments, the forks may be controlled pneumatically hydraulically. In the instance, the forks may be controlled by at least two members respectively ensuring their horizontal and vertical displacements.

In the example described the control motor 10 controlling the forks 4 is reversible. However, in modified embodiments, the control motor of the forks may be irreversible but in such instances there is advantageously provided a reverser for reverting the direction of running in combination with a speed reducer in the transmission means connecting said motor with the main control shaft.

It should be understood that the present invention is not exclusively limited to the embodiment shown and that many modifications may be made to the form disposition and arrangement of some of its component parts provided that these modifications are not contradictory to the object of each of the following claims.

What is claimed is:

1. A palletising or depalletising magazine serving to contain a stack of superimposed pallets whereof the lower pallet is carried by retractable co-planar substantially horizontally disposed support means and can be placed on a conveyor so as to be individually removable; a displaceable carriage having first guide means to confine the displacement thereof to a first direction, and having second guide means for receiving said retractable support means;

said retractable support means having extending therefrom a plurality of elongate forks adapted to extend under the final lower pallet a distance greater than half the dimension of the pallets as measured in a direction parallel to the elongate dimension of the forks;

a first rigid member coupled to said carriage to periodically effect the displacement thereof in said first direction;

a second rigid member coupled to said support means for periodically effecting the displacement thereof in a second direction; and common drive means coupled to said first and said second members for operating said members in a predetermined sequential relationship whereby said forks are successively;

lowered into the palletising or depalletising magazine to bring the stack of pallets onto the conveyor which is then stationary;

removed from the final lower pallet resting on the conveyor at only one side of the stacks; and reintroduced into the palletising or depalletising magazine at the one side of the stack at the level of the penultimate lower pallet and raised in the palletising or depalletising magazine to then carry the penultimate lower pallet and to raise it as well as the remaining pallets;

the said final lower pallet remaining alone on the conveyor which can then be operated, whereby the forks can again be displaced in the same manner to perform identical cycles.

2. Palletising or depalletising magazine according to claim 1 wherein the forks are successively displaceable in the following manner:

vertically from an upper advanced position wherein they carry the stack of pallets in the palletising or depalletising magazine to a lower advanced position wherein they place the stack of pallets in the palletising or depalletising magazine on the conveyor which is then stationary and release the final lower pallet;

horizontally said distance greater than half the dimension of the pallet from the lower advanced position to a lower withdrawn position wherein they are removed from the palletising or depalletising magazine;

vertically from the lower withdrawn position to an intermediate withdrawn position wherein they are located outside the palletising or depalletising magazine at the level of the penultimate pallet of the stack resting on the conveyor;

horizontally said distance greater than half the dimension of the pallet from the intermediate withdrawn position to an intermediate advanced position wherein they are engaged in the palletising or depalletising magazine below the upper members of the lower penultimate pallet of the stack resting on the conveyor; and vertically from the intermediate advanced position to the upper advanced position up to which they raise the remaining pallets in the palletising or depalletising magazine.

3. Palletising or depalletising magazine according to claim 1, wherein the forks are rigidly interconnected.

4. Palletising or depalletising magazine according to claim 1, wherein the drive means are controlled electromechanically.

5. Palletising or depalletising magazine according to claim 1, wherein the drive means are controlled pneumatically.

6. Palletising or depalletising magazine according to claim 1, wherein the drive means are controlled hydraulically.

7. Palletising or depalletising magazine according to claim 1, wherein the drive means are controlled by a single motor member during their displacements.

8. A palletising or depalletising magazine serving to contain a stack of superimposed pallets where the lower pallet is carried by retractable supports, can be placed on a conveyor so as to be individually removable, the retractable supports comprising a plurality of substantially co-planar horizontal forks which are successively:

lowered into the palletising or depalletising magazine to bring the stack of pallets onto the conveyor which is then stationary;

removed from the final lower pallet resting on the conveyor; and reintroduced into the palletising or depalletising magazine at the level of the penultimate lower pallet and raised in the palletising or depalletising magazine to then carry the penultimate lower pallet and to raise it as well as the remaining pallets;

the said final lower pallet remaining alone on the conveyor which can then be operated, whereby the forks can again be displaced in the same manner to perform identical cycles;

the magazine further comprising a single motor member and a control shaft driven by the single motor member, a pivoting lever articulated to the forks and selectively acted upon by the control shaft ensuring the horizontal displacement of the forks, and at least one crank articulated to a connecting rod connected to the forks and ensuring the vertical displacement of the forks.

9. Palletising or depalletising magazine according to claim 8, wherein the control shaft acts via cams on the pivoting lever and on the crank.

10. Palletising or depalletising magazine according to claim 9 wherein the contact point between the pivoting lever and the corresponding cam is located substantially level with the control shaft and on the opposite side to the palletising or depalletising magazine relative to said control shaft, the pivoting lever being moreover influenced elastically by a spring so as to be applied against said cam whilst the contact point between the crank and the corresponding cam is located slightly above the level of said control shaft and on the same side as the palletising or depalletising magazine, the crank being moreover influenced so as to be supported against the cam substantially under the weight of the loads which it carries.

11. A palletising or depalletising magazine serving to contain a stack of superimposed pallets where the lower pallet is carried by retractable supports, can be placed on a conveyor so as to be individually removable, the retractable supports comprising a plurality of substantially co-planar horizontal forks which are successively:

lowered into the palletising or depalletising magazine to bring the stack of pallets onto the conveyor which is then stationary;

removed from the final lower pallet resting on the conveyor; and reintroduced into the palletising or depalletising magazine at the level of the penultimate lower pallet and raised in the palletising or depalletising magazine to then carry the penultimate lower pallet and to raise it as well as the remaining pallets;

the said final lower pallet remaining alone on the conveyor which can be operated, whereby the forks can again be displaced in the same manner to perform identical cycles;

the magazine further comprising a single motor member, a control shaft driven by said single motor member, at least one pivoting lever articulated to the forks so as to ensure the horizontal displacement thereof, at least one crank articulated to a connecting rod connected to the forks so as to ensure the vertical displacement thereof and guidance means including rollers for guiding the forks horizontally and/or vertically.

12. A palletising or depalletising magazine serving to contain a stack of superimposed pallets where the lower pallet is carried by retractable supports, can be placed on a conveyor so as to be individually removable, the retractable supports comprising a plurality of substantially co-planar horizontal forks which are successively:

lowered into the palletising or depalletising magazine to bring the stack of pallets onto the conveyor which is then stationary;

removed from the final lower pallet resting on the conveyor; and reintroduced into the palletising or depalletising magazine at the level of the penultimate lower pallet and raised in the palletising or depalletising magazine to then carry the penultimate lower pallet and to raise it as well as the remaining pallets;

the said final lower pallet remaining alone on the conveyor which can then be operated, whereby the forks can again be displaced in the same manner to perform identical cycles;

the magazine further comprising a single motor member and control shaft coupled to the forks for controlling the displacement thereof, the single motor member being reversible to transmit selectively to the control shaft a rotation in one or the other direction.

13. A palletising or depalletising magazine serving to contain a stack of superimposed pallets where the lower pallet is carried by retractable supports, can be placed on a conveyor so as to be individually removable, the retractable supports comprising a plurality of substantially co-planar horizontal forks which are successively:

lowered into the palletising or depalletising magazine to bring the stack of pallets onto the conveyor which is then stationary;

removed from the final lower pallet resting on the conveyor; and reintroduced into the palletising or depalletising magazine at the level of the penultimate lower pallet and raised in the palletising or depalletising magazine to then carry the penultimate lower pallet and to raise it as well as the remaining pallets;

the said final lower pallet remaining alone on the conveyor which can then be operated, whereby the forks can again be displaced in the same manner to perform identical cycles;

the magazine further comprising a single motor, a control shaft and transmission means connecting the single motor to the control shaft comprising a direction reverser for transmitting selectively to the control shaft a rotation in one direction or the other, the control shaft being coupled to the forks for controlling the displacement thereof.

* * * * *